Sept. 27, 1955  
J. M. BARSTOW, JR  
ELECTRICAL CONVERSION SYSTEM WITH
HIGH AND LOW VOLTAGE ALARM  
Filed May 16, 1952

2,719,289

INVENTOR
J. M. BARSTOW JR.
BY Earl C. Laughlin
ATTORNEY

United States Patent Office

2,719,289
Patented Sept. 27, 1955

---

2,719,289

ELECTRICAL CONVERSION SYSTEM WITH HIGH AND LOW VOLTAGE ALARM

John M. Barstow, Jr., New Providence, N. J., assignor to Bell Telephone Laboratories, Incorporated, New York, N. Y., a corporation of New York Application May 16, 1952, Serial No. 288,285

9 Claims. (Cl. 340—253)

---

The invention relates to electrical conversion systems and particularly to a system for converting alternating to direct current at desired voltages, and to is applications.

An object of the invention is to convert an alternating current voltage into two direct current voltages of opposite polarity.

A related object is to convert an alternating current of varying voltage into two direct current voltages of opposite polarity proportional thereto.

Another object is to indicate accurately with simple and economical apparatus a low and a high voltage condition of an alternating current source.

These objects are attained in accordance with the invention by the use of a simple circuit arrangement employing a small number of apparatus elements, consisting essentially of a diode rectifier and two resistors. These elements are so connected with respect to each other, to a set of input terminals across which an alternating current source of variable voltage is connected and to two sets of output terminals that a positive and a negative direct current voltage each proportional to the voltage of the alternating current source, are respectively produced across a different one of the two sets of output terminals. In one practical application of this electrical conversion circuit, the increase in the produced negative direct current voltage when the voltage of the alternating current source exceeds a maximum tolerable value, causes the operation of a high voltage alarm and the decrease in the produced positive direct current voltage when the voltage of the alternating current source falls below a minimum tolerable value, causes the operation of a low voltage alarm.

Figure 1:
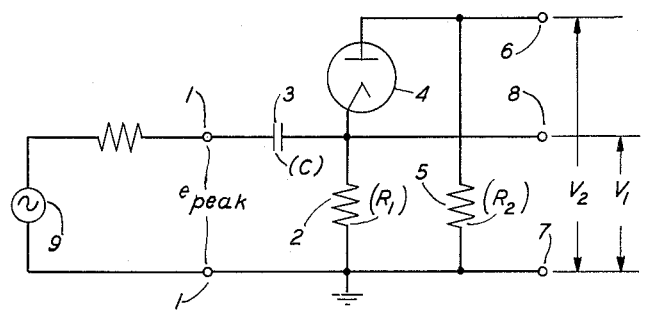
Figure 2:
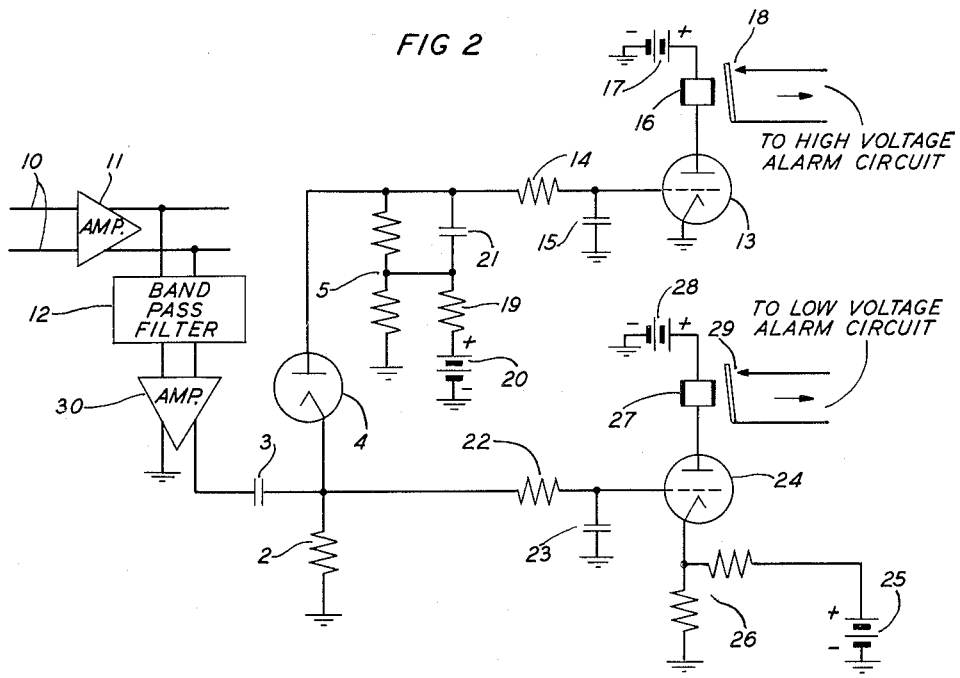

The various features and the advantages of the circuits of the invention are described more fully in the following complete description thereof to be read in conjunction with the accompanying drawing in which:

Fig. 1 shows schematically one embodiment of an electrical conversion system in accordance with the invention; and Fig. 2 shows schematically an application of such a system to a high-low voltage alarm circuit.

The electrical conversion circuit shown in Fig. 1 includes input terminals 1; a first resistor 2 having one terminal grounded and of selected value $R_1$, connected in series with a capacitor 3 of selected value C, across the input terminals 1; a diode rectifier 4 poled as shown, and a second resistor 5 of selected value $R_2$, connected in series with each other across the first resistor 2; and two sets of output terminals 8, 7 and 6, 7 having the common terminal 7 grounded, connected directly across the first resistor 2 and the second resistor 5, respectively.

The system of Fig. 1 operates as follows: When the alternating current signal source 9 is connected across the input terminals 1, the alternating current produced by that source flows over the path including the capacitor 3 and the first resistor 2 in series, and is also applied to the diode rectifier 4. The diode rectifier 4 is poled so as not to conduct the positive half-cycles of the applied current. Therefore, a positive direct current voltage very nearly equal to the peak voltage, $e_{peak}$, of the alternating current source 9 will be developed across the first resistor 2, provided that the time constant $R_1C$ of the first resistor 2 and the capacitor 3, is large compared to the time duration of one half-cycle of the applied alternating current signal. However, the diode 4 will conduct the negative half-cycles of the applied signal current, so that during these negative half-cycles the impedance across which the peak voltage, $e_{peak}$, is developed is changed from $R_1$ to approximately that of the parallel combination of resistor 2 ($R_1$) and resistor 5 ($R_2$), assuming that the diode 4 is of very low resistance. If the signal source 9 is a high impedance (constant current) generator, and if the resistance values $R_1$ and $R_2$ of resistors 2 and 5 respectively, are of the same order of magnitude, the amount of negative voltage developed across the parallel resistance combination will be appreciably less than the magnitude of the positive voltage developed across resistor 2 alone. Regardless of the impedance of the signal source, the time constant $R_{eff}C$ of the complete circuit, where $$R_{eff} = \frac{R_1 R_2}{R_1 + R_2}$$

is considerably less than the time constant $R_1C$, so that the extent to which negative voltage is developed across the parallel combination of resistors 2 and 5 is less than the extent to which positive voltage is developed across the resistor 2. For the above reasons, the voltage $V_1$ appearing across the output terminals 8, 7 has a positive average value. Moreover, the amount of this positive direct current component increases and decreases as the signal voltage increases and decreases, respectively. However, the voltage $V_2$ appearing across the output terminals 6, 7 since it is developed across the resistor 5 at the plate of the diode 4, can only have a negative direct current value. Also, the magnitude of this negative voltage component increases and decreases as the signal voltage increases and decreases, respectively.

Thus, the circuit of Fig. 1 provides means for converting an alternating current signal into two direct current voltages of opposite polarity, which are respectively proportional to the signal voltage. It is apparent that the proportion of the negative voltage $V_2$ relative to the positive voltage $V_1$ developed can be varied by varying the values of the resistors $R_1$ and $R_2$. For instance, if $R_1=0$, $V_1=0$; but $V_2$ is finite. Conversely, if $R_2=0$, $V_2=0$; but $V_1$ has a finite direct current component. Thus, for variable ratios of $R_1$ and $R_2$, variable ratios of $V_1$ and $V_2$ can be obtained.

Fig. 2 shows the application of an electrical conversion circuit in accordance with the invention, such as shown in Fig. 1, to an alarm circuit for detecting abnormal variations in the voltage of an alternating current pilot wave, which pilot wave is used to regulate the gain of amplifiers at repeater or terminal points of a carrier telephone system to compensate for line loss variations.

In Fig. 2, a portion of a line 10 including an amplifier 11, at one gain-regulating point of a carrier system, transmitting an incoming alternating current pilot wave of a given frequency used for controlling the gain regulating equipment, is shown. The input of a band-pass filter 12 adapted for selectively passing waves of the frequency of the pilot wave, is bridged across the line 10 at the output of amplifier 11. An amplifier 30 for increasing the amplitude of the portion of the pilot wave passed through the filter 12 is placed in tandem with the filter. A frequency conversion circuit substantially identical with that illustrated in Fig. 1 and described above is indicated by the use of the same reference number for designating the corresponding elements, is fed from the output of the amplifier 30, the resistor 2 of that circuit being connected through series capacitor 3 across the output of that amplifier. The diode rectifier 4 poled as shown, is connected in series with resistor 5 across the terminals of resistor 2. The terminals of resistor 5 are connected across the grid-cathode circuit of a three-electrode space discharge tube 13 through series resistor 14 and shunt capacitor 15. The winding of an electromagnetic relay 16 is connected in series with the plate battery 17 in the plate-cathode circuit of tube 13. The switching contacts 18 of relay 16 are connected in series with a high voltage alarm circuit (not shown). The control grid of tube 13 is biased positively by a connection through resistor 14 and the upper portion of resistor 5 in series to a positive potential point on the voltage divider comprising resistor 19 and the lower portion of resistor 5 in series, connected across battery 20. A capacitor 21 is connected in shunt with the upper portion of the resistor 5 to increase the average negative direct current voltage applied to the control grid of tube 13 from resistor 5 in the manner to be described. It does this by retaining the charge impressed upon it by the voltage drop produced in the upper portion of resistor 5 during the negative half-cycles of the applied alternating pilot voltage, for a sufficient interval of time.

The terminals of the resistor 2 are connected through series resistor 22 and shunt condenser 23 across the control grid-cathode circuit of the three-electrode space discharge tube 24 having its cathode positively biased from the battery 25 through the resistance divider 26. An electromagnetic relay 27 is connected in series with the plate battery 28 in the plate-cathode circuit of the tube 24. The switching contacts 29 of relay 27 are connected in series with a low voltage alarm circuit (not shown). The same battery may be used for the separate batteries designated 17, 20, 25 and 28 shown.

When a wave of the pilot frequency appears in the output of the circuit 10, one energy portion thereof will be diverted into the input of the band-pass filter 12 and will be passed by that filter. Both the positive and negative half-cycles of the pilot frequency wave appearing in the output of filter 12 will be applied through series condenser 3 to the resistor 2 and to the diode rectifier 4. In the manner previously described in connection with the similar conversion circuit of Fig. 1, a positive direct current voltage varying proportionally to the voltage of the pilot frequency wave in circuit 10 will be developed across the resistor 2; and a negative direct current voltage also proportional to the voltage of the pilot frequency in circuit 10 will be developed across the parallel resistance combination 2 and 5. The positive direct current voltage is applied through series resistor 22 and shunt capacitor 23 to the control grid circuit of tube 24, and the negative direct current voltage applied through series resistor 14 and shunt capacitor 15 to the control grid circuit of tube 13. The tube 13 and the values of the associated batteries, resistors and capacitors are selected such that when the voltage of the pilot frequency wave in the output of amplifier 11 in circuit 10 is below the maximum tolerable value, the proportional negative voltage appearing across resistor 5 and applied to the positively biased grid of tube 13 will not be sufficient to bias that tube to cut-off so that it will be maintained operated to operatively energize the relay 16 in its plate circuit. The operated relay 16 will maintain its switching contacts 18 in the open condition shown to break the energizing circuit for the associated high voltage alarm circuit so that no alarm will be given. Similarly, the tube 24 and the values of the batteries, resistors and capacitors associated therewith are selected such that when the voltage of the pilot frequency wave in the output of the amplifier 11 in circuit 10 is above the minimum tolerable value, the proportional positive direct current voltage appearing across the resistor 2 and applied to the effectively negatively biased control grid of tube 24, because of its positively biased cathode, will be sufficiently large to overcome this negative bias to such an extent that tube 24 will be operated and thus operatively energizes the relay 27 in its plate circuit. The operated relay 27 will maintain the relay switching contacts 29 in the open condition shown to break the energizing circuit for the associated low voltage alarm circuit and prevent an alarm being given.

If the voltage of the pilot wave in the output of the amplifier 11 in circuit 10 exceeds the maximum tolerable value, the negative voltage developed across the resistor 5 will be increased to a value which will cause the negative voltage applied thereby through resistor 14 and condenser 15 to the control grid circuit of tube 13 to be increased sufficiently to cut off tube 13. This will cause relay 16 to release closing its switching contacts 18 and bringing in a high voltage alarm in the associated alarm circuit.

If the voltage of the pilot frequency wave in the output of amplifier 11 in circuit 10 decreases below the minimum tolerable value, the positive voltage developed across the resistor 2 will decrease sufficiently to reduce the positive voltage applied through resistor 22 and condenser 23 to the control grid circuit of tube 24 so that the tube 24 will cease to conduct. This will cause the relay 27 in its plate circuit to release to close the relay switching contacts 29 so as to bring in a low voltage alarm in the associated alarm circuit.

By proper selection of the values of the elements associated with the space discharge tubes 13 and 24 in the circuit of Fig. 2, the alarm circuits may be made to operate for any desired values of the applied pilot voltage. The diode rectifier 4 in the circuits of Figs. 1 and 2 may be alternatively poled so as to pass the positive half-cycles and prevent transmission of the negative half-cycles of the applied alternating current. In this case a negative direct current voltage will be developed across resistor 2 and a positive direct current voltage will be developed across the parallel combination of resistors 2 and 5; so that a negative direct current voltage will appear across terminals 7, 8 and a positive direct current voltage will appear across terminals 6, 7 (Fig. 1), or a positive direct current voltage will be applied to the grid circuit of tube 13 and a negative direct current voltage will be applied to the grid circuit of tube 24 (Fig. 2) to control the associated alarm circuits. Various other modifications of the circuits illustrated and described above which are within the spirit and scope of the invention will occur to persons skilled in the art.

What is claimed is:

1. In combination, a source of alternating current, a first resistor connected across said source, a second resistor and a diode rectifier connected in series with each other across said first resistor, said rectifier being poled to pass the half-cycles of one polarity only of the alternating current wave applied thereto from said source, one output circuit connected directly across said first resistor and a second output circuit connected directly across said second resistor.

2. A circuit for producing two direct current voltages of opposite polarity from an alternating current source, comprising a first resistor connected across said source, a second resistor and a diode rectifier connected in series with each other across said first resistor, said rectifier being poled in such direction as to prevent transmission therethrough of the positive half-cycles of the alternating current wave applied thereto from said source and to pass the negative half-cycles thereof, one output circuit connected directly across said first resistor for taking off the positive direct current voltage developed thereacross by the applied alternating current wave and a second output circuit connected directly across said second resistor for taking off the negative direct current voltage developed across the parallel combination of said first and said second resistors during negative half-cycles of the applied alternating current wave.

3. A circuit for producing from an alternating current source of variable voltage two direct current voltages proportional thereto and of opposite polarity, comprising input terminals adapted for connection across said source, a first resistor and a capacitor in series connected across said input terminals, a second resistor and a diode rectifier connected in series across said first resistor, said rectifier being poled so as to transmit the negative half-cycles of the alternating current applied thereto from said source and not to transmit the positive half-cycles thereof, one output circuit connected directly across said first resistor for taking off the positive direct current voltage developed thereacross by the applied alternating current, and a second output circuit connected directly across said second resistor for taking off the negative direct current voltage developed across the parallel combination of said first and said second resistors during the negative half-cycles of the applied alternating current.

4. The circuit of claim 3, in which the values of said first resistor and said capacitor are selected to make their time constant large compared to one half-cycle of the applied alternating current voltage so that the positive direct current voltage developed across said first resistor is very nearly equal to the peak voltage of said alternating current source.

5. The circuit of claim 3, in which said alternating current source is a high impedance (constant current) generator and the resistance values of said first and second resistors are of the same order of magnitude so that the amount of negative voltage developed across the parallel combination of said first and said second resistors is appreciably less than the magnitude of the positive voltage developed across said first resistor.

6. A circuit for indicating low and high voltage conditions of an alternating current source of varying voltage, comprising a first resistor connected across and fed from said alternating current source, a diode rectifier and a second resistor connected in series with each other across said first resistor, said rectifier being poled so as to pass only the negative half-cycles of the alternating current wave applied thereto by said source, one output circuit connected across said first resistor for taking off the positive direct current voltage varying with the voltage of said source developed thereacross, a second output circuit connected directly across said second resistor for taking off the negative direct current voltage varying with the voltage of said alternating current source developed across the parallel combination of said first and said second resistors during negative half-cycles of the applied alternating current wave, high voltage alarm means responsive to the increase in the negative voltage taken off by said one output circuit when the voltage of the applied alternating current wave reaches a maximum tolerable value, and low voltage alarm means responsive to the decrease in the positive direct current voltage taken off in said second output circuit when the voltage of the applied alternating current wave falls below a minimum tolerable value.

7. A voltage alarm circuit comprising input terminals adapted for connection across an alternating current source subject to variations in voltage, a first resistor and a capacitor connected in series across said input terminals, a diode rectifier and a second resistor connected in series across said first resistor, said rectifier being poled so as to transmit the negative half-cycles of the alternating current applied thereto from said source through said input terminals and said capacitor but not the positive half-cycles thereof, two electron discharge devices each having a cathode, an anode and a control electrode, and circuits therefor, means for applying the positive direct current voltage developed across said first resistor by the applied alternating current from said source to the control grid circuit of one of said devices, and the negative direct current voltage developed across said first and said second resistors during negative half-cycles of the applied alternating current to the control grid circuit of the second device, the electrodes of said devices being normally biased so that when the voltage of said source is within tolerable limits, the positive and negative direct current voltages proportional thereto produced respectively across said first resistor and across the parallel combination of said first and said second resistors and applied to the control grid circuit of said one and said second discharge device, respectively, maintain the respective devices operated, when the voltage of said alternating current source falls below a minimum tolerable value, the decrease in the proportional positive voltage applied to the control grid circuit of said one device is such as to cause that device to be rendered inoperative and when the voltage of said source increases above the maximum tolerable value the increase in the proportional negative voltage applied to the control grid circuit of said second device is such as to cause said second device to be rendered inoperative, low voltage alarm means operatively responsive to an inoperative condition of said one device and high voltage alarm means operatively responsive to an inoperative condition of said second device.

8. The alarm circuit of claim 7, in which an electromagnetic relay in the anode circuit of each of said devices is operatively energized when the device is in the operated condition, and said low voltage and high voltage alarm circuits are respectively responsive to the release of the relay in the anode circuits of said one and said second device, respectively, when the respective devices are rendered inoperative.

9. A circuit for producing two direct current voltages of opposite polarity from an alternating current source, comprising a first resistor connected across said source, a second resistor and a diode rectifier connected in series with each other across said first resistor, said diode rectifier being poled in such direction as to prevent transmission therethrough of the negative half-cycles of the alternating current wave applied thereto from said source and to pass the positive half-cycles thereof, one output circuit connected directly across said first resistor for taking off the negative direct current voltage developed thereacross by the applied alternating current wave and a second output circuit connected directly across said second resistor for taking off the positive direct current voltage developed across the parallel combination of said first and said second resistors during positive half-cycles of the applied alternating current wave.

References Cited in the file of this patent

UNITED STATES PATENTS

| | | |
|---|---|---|
| 1,895,542 | Deardorff | Jan. 31, 1933 |
| 2,000,986 | Rechnitzer | May 14, 1935 |
| 2,249,323 | Mitchell | July 15, 1941 |
| 2,512,639 | Gohorel | June 27, 1950 |